United States Patent
Itohara (10) Patent No.: US 7,071,667 B2
(45) Date of Patent: Jul. 4, 2006

(54) DC—DC CONVERTER

(75) Inventor: Mitsuru Itohara, Kyoto (JP)

(73) Assignee: Texas Instruments Incorporated, Dallas, TX (US)

( * ) Notice: Subject to any disclaimer, the term of this patent is extended or adjusted under 35 U.S.C. 154(b) by 146 days.

(21) Appl. No.: 10/938,479

(22) Filed: Sep. 10, 2004

(65) Prior Publication Data

US 2005/0088159 A1 Apr. 28, 2005

(30) Foreign Application Priority Data

Sep. 11, 2003 (JP) ............................. 2003-320230

(51) Int. Cl.
*G05F 1/40* (2006.01)
*G05F 1/652* (2006.01)

(52) U.S. Cl. ...................................... 323/284; 323/222

(58) Field of Classification Search ................. 323/222, 323/225, 282, 284, 285, 351
See application file for complete search history.

(56) References Cited

U.S. PATENT DOCUMENTS

| 5,220,272 A * | 6/1993 | Nelson ........................ 323/282 |
| 6,215,288 B1 * | 4/2001 | Ramsey et al. ............. 323/284 |
| 2005/0057238 A1 * | 3/2005 | Yoshida ....................... 323/282 |

* cited by examiner

*Primary Examiner*—Jessica Han
(74) *Attorney, Agent, or Firm*—William B Kempler; W. James Brady, III; Frederick J. Telecky, Jr.

(57) ABSTRACT

A DC—DC converter, which can respond quickly and suitably to changes in input voltage within the scope of normal operating conditions to return to the normal operating state. The DC—DC converter is comprised of switching power supply unit 10, which can turn on/off switching elements that can be turned on/off at high frequency to convert a DC input voltage $V_{in}$ into a DC output voltage $V_{out}$, and a control unit 12, which is used to control the on/off operation of the switching elements of said switching power supply unit 10. In control unit 12, when DC output voltage $V_{out}$ is out of the range of monitoring value AM, the response characteristic of the feedback loop (especially the response characteristic of error amplifier 14) is switched to a greater responsivity to continue the switching control operation of the control system without stopping it.

20 Claims, 4 Drawing Sheets

DC—DC CONVERTER

FIELD OF THE INVENTION

The present invention pertains to a DC—DC converter that can convert from one input DC level (direct current) into another DC level (direct current).

BACKGROUND OF THE INVENTION

A DC—DC converter is a DC power supply that is small, lightweight, and highly efficient, and uses a semiconductor switching element. It is widely used in electronic devices, etc. In recent years, there has been a great demand for small, lightweight, and highly efficient power supplies. The basic principle of a DC—DC converter is that the switching element is turned on/off at high frequency, and the ratio of the on-time to off-time, that is, the duty ratio, is controlled in a variable manner to keep the DC output voltage at a certain level. Usually, the voltage is controlled to a constant level through negative feedback of the output voltage. More specifically, the output voltage is fed back and compared with a reference value by an error amplifier to find the error. A switching control circuit varies the duty ratio of the switching drive pulse sent to the switching element corresponding to the error signal of the error amplifier.

In a conventional DC—DC converter, in order to protect the load circuit from over-voltages, when the DC output voltage exceeds a preset monitoring level, a protection circuit comprised of a comparator or Zener diode, etc. starts to operate to stop the switching control operation in the control system (specifically, the switching control circuit). In order to restore regular operation after the switching control operation is stopped, a start command can be applied from the outside after the output voltage drops to zero V, or the switching control operation in the control system is restarted after it is found that the output voltage goes below than a prescribed level, such as the aforementioned monitoring level.

SUMMARY OF THE INVENTION

As described above, the over-voltage protection function in a conventional DC—DC converter is to stop the switching control operation of the control system when the DC output voltage exceeds the over-voltage monitoring level. However, when the over-voltage output is not caused by damage, it is usually in response to a change in input voltage within the scope of normal operating conditions. For example, if the plug (DC output terminal) of the AC adapter of a portable electronic device is inserted into a power socket, the input power supply voltage with respect to the DC—DC converter rises stepwise from the power supply voltage of the internal battery to the power supply voltage of the AC adapter. If no constant voltage control is performed in response to this sharp change in input voltage, an over-voltage output state will occur instantaneously.

It is inappropriate to stop the operation of the entire control system for this instantaneous transition state, and the reliability will be compromised. In other words, in the conventional DC—DC converter, a restoration process in which an external start command is applied after the output is shut down completely not only results in too much protection but also requires time to restart the system. As a result, the performance of the given electronic device is compromised. On the other hand, a process in which the switching control operation restarts after the output voltage drops to a safe level is unstable because the state of the control system is not guaranteed immediately after restarting. As a result, the output voltage might again return to the over-voltage condition or fall below the rated voltage.

A general object of the present invention is to solve or reduce the problems of the aforementioned conventional technologies by providing a DC—DC converter that can respond quickly and appropriately to changes in input voltage within the scope of normal operating conditions.

This and other objects and features are provided, in accordance with one aspect of the present invention comprising the following: a switching power supply unit, which has a switching element that can be turned on/off at high frequency and can turn on/off the aforementioned switching element to convert a DC input voltage into a DC output voltage; an error amplifier, which compares the aforementioned DC output voltage obtained from the aforementioned switching power supply unit with a reference value and outputs an error signal corresponding to the comparison error under a selected response characteristic, that is, either a first response characteristic or a second response characteristic having greater responsivity than the first response characteristic; a switching control unit, which generates a switching drive pulse corresponding to the aforementioned error signal output from the error amplifier for making the DC output voltage consistent with the aforementioned reference value and sends the switching drive pulse to the aforementioned switching element; and a response characteristic selection circuit, which compares the aforementioned DC output voltage with a desired monitoring value and selects the aforementioned first response characteristics as the response characteristic of the aforementioned error amplifier when the DC output voltage is within the range of the aforementioned monitoring value and selects the second response characteristic as the response characteristic of the error amplifier when the DC output voltage is out of the range of the monitoring value.

In the aforementioned configuration, when the DC output voltage is within range of the monitoring value, the first response characteristic for normal application is selected as the response characteristic of the error amplifier to perform constant voltage control emphasizing stability of the feedback loop. When the DC output voltage is out of the range of the monitoring value, the second response characteristic for emergency control is selected to perform constant voltage control emphasizing high speed operation of the feedback loop. In this way, even if the input voltage varies abruptly within the scope of normal operating conditions, over-voltage outputs can be avoided and eliminated quickly and appropriately depending on the self-monitoring restoration function of the control system itself without stopping the switching control operation of the control system.

Another aspect of the present invention comprises the following: a switching power supply unit, which has a switching element that can be turned on/off at high frequency and can turn on/off the aforementioned switching element to convert a DC input voltage into a DC output voltage; an error amplifier, which compares the aforementioned DC output voltage obtained from the aforementioned switching power supply unit with a reference value and outputs an error signal corresponding to the comparison error at a selected response speed, that is, either a first response speed or a second response speed higher than the first response speed; a switching control unit, which generates a switching drive pulse corresponding to the aforementioned error signal output from the error amplifier for making the DC output voltage consistent with the aforementioned reference value and sends the switching drive pulse to the aforementioned switching element; and a response speed selection circuit, which compares the aforementioned DC output voltage with a desired monitoring value and selects the aforementioned first response speed as the response speed of the aforementioned error amplifier when the DC output voltage is within the range of the aforementioned monitoring value and selects the second response speed as the response speed of the error amplifier when the DC output voltage is out of the range of the monitoring value.

In the aforementioned configuration, when the DC output voltage is within the range of the monitoring value, the first response speed for normal application is selected as the response speed of the error amplifier to perform constant voltage control emphasizing stability of the feedback loop. When the DC output voltage is out of range of the monitoring value, the second response speed for emergency control is selected to perform constant voltage control emphasizing high speed operation of the feedback loop. In this way, the same effect as that of the aforementioned first DC—DC converter can be realized.

A third aspect of the present invention comprises the following: a switching power supply unit, which has a switching element that can be turned on/off at high frequency and can turn on/off the aforementioned switching element to convert a DC input voltage into a DC output voltage; an error amplifier, which compares the aforementioned DC output voltage obtained from the aforementioned switching power supply unit with a reference value and outputs an error signal corresponding to the comparison error at a selected gain, that is, either a first gain or a second gain higher than the first gain; a switching control unit, which generates a switching drive pulse corresponding to the aforementioned error signal output from the error amplifier for making the DC output voltage consistent with the aforementioned reference value and sends the switching drive pulse to the aforementioned switching element; and a gain selection circuit, which compares the aforementioned DC output voltage with a desired monitoring value and selects the aforementioned first gain as the gain of the aforementioned error amplifier when the DC output voltage is within the range of the aforementioned monitoring value and selects the second gain as the gain of the error amplifier when the DC output voltage is out of the range of the monitoring value.

In the aforementioned configuration, when the DC output voltage is within the range of the monitoring value, the first gain for normal application is selected as the gain of the error amplifier to perform constant voltage control emphasizing stability of the feedback loop. When the DC output voltage is out of the range of the monitoring value, the second gain for emergency control is selected to perform constant voltage control emphasizing high speed operation of the feedback loop. In this way, the same effect as that of the aforementioned first DC—DC converter can be realized.

The fourth aspect of the present invention comprises the following: a switching power supply unit, which has a switching element that can be turned on/off at high frequency and can turn on/off the aforementioned switching element to convert a DC input voltage into a DC output voltage; an error amplifier, which compares the aforementioned DC output voltage obtained from the aforementioned switching power supply unit with a reference value and outputs an error signal corresponding to the comparison error using a selected bias current, that is, either a first bias current or a second bias current larger than the first bias current; a switching control unit, which generates a switching drive pulse corresponding to the aforementioned error signal output from the error amplifier for making the DC output voltage consistent with the aforementioned reference value and sends the switching drive pulse to the aforementioned switching element; and a bias current selection circuit, which compares the aforementioned DC output voltage with a desired monitoring value and selects the aforementioned first bias current as the bias current of the aforementioned error amplifier when the DC output voltage is within the range of the aforementioned monitoring value and selects the second bias current as the bias current of the error amplifier when the DC output voltage is out of the range of the monitoring value.

In the aforementioned configuration, when the DC output voltage is within the range of the monitoring value, the first bias current for normal application is selected as the bias current in the error amplifier to perform constant voltage control emphasizing stability of the feedback loop. When the DC output voltage is out of range of the monitoring value, the second bias current for emergency control is selected to perform constant voltage control emphasizing high speed operation of the feedback loop. In this way, the same effect as that of the aforementioned first DC—DC converter can be realized, and switching between the two constant voltage control modes can be performed quickly and appropriately.

The fifth aspect of the present invention comprises the following: a switching power supply unit, which has a switching element that can be turned on/off at high frequency and can turn on/off the aforementioned switching element to convert a DC input voltage into a DC output voltage; an error amplifier, which has a differential amplifier, which compares the aforementioned DC output voltage obtained from the aforementioned switching power supply unit with a reference value and outputs an error signal corresponding to the comparison error, and an output circuit, which includes an output resistor and a capacitor connected in series between the output terminal of the aforementioned differential amplifier and ground potential, and which can select the resistance of the aforementioned output resistor between a first resistance and a second resistance higher than the first resistance; a switching control unit, which generates a switching drive pulse corresponding to the aforementioned error signal output from the error amplifier for making the DC output voltage consistent with the aforementioned reference value and sends the switching drive pulse to the aforementioned switching element; and an output resistance selection circuit, which compares the aforementioned DC output voltage with a desired monitoring value and selects the aforementioned first resistance as the resistance of the output resistor in the aforementioned error amplifier when the DC output voltage is within the range of the aforementioned monitoring value and selects the second resistance as the resistance of the output resistor when the DC output voltage is out of the range of the monitoring value.

In the aforementioned configuration, when the DC output voltage is within the range of the monitoring value, the first resistance for normal application is selected as the resistance of the output resistor in the error amplifier to perform constant voltage control emphasizing stability of the feedback loop. When the DC output voltage is out of the range of the monitoring value, the second resistance for emergency control is selected to perform constant voltage control emphasizing high speed operation of the feedback loop. In this way, the same effect as that of the aforementioned first DC—DC converter can be realized, and switching between the two constant voltage control modes can be performed quickly and appropriately.

In a DC—DC converter of the present invention, it is preferred that the switching power supply unit be a chopper type switching power supply unit, which converts the aforementioned DC input voltage into a square-wave DC voltage via the aforementioned switching element and then rectifies and smooths the square-wave DC voltage to convert it into the aforementioned DC output voltage. In this case, as a preferred embodiment, the switching power supply unit comprises a rectifying and smoothing circuit including a choke coil and a smoothing capacitor. As another preferred embodiment, the switching power supply unit comprises a first transistor for main switching and a second transistor for synchronous rectification. The first and second transistors are driven by a first and a second switching drive pulses of opposite polarity, respectively. In other words, when the first transistor is on, the second transistor is off. As a result, the DC input voltage is supplied to the choke coil via the first transistor, and energy is stored in the choke coil. When the second transistor is off, the second transistor is turned on instead to generate a reflex current, and energy is released from the choke coil to the load. However, when the output becomes an over-voltage, the current in the opposite direction is allowed to flow from the side of the output terminal to ground with the second transistor on. In this way, elimination of the over-voltage output can be accelerated.

In another preferred embodiment, the switching control unit controls the pulse width of the aforementioned switching drive pulse in a variable manner corresponding to the error signal output from the aforementioned error amplifier.

When the DC—DC converter of various aspects of the present invention is used, even if the input voltage varies quickly and abruptly within the scope of normal operating conditions, the operation of the control system can be restored to the regular operating state quickly and appropriately without being stopped.

REFERENCE NUMERALS AND SYMBOLS AS SHOWN IN THE DRAWINGS

In the figures, 10 represents a switching power supply unit, 12 represents a control unit, 14 represents an error amplifier, 16 represents a switching control circuit, 18 represents a reference voltage generating circuit, 20 represents a monitoring value setting circuit, 22 represents a response characteristic selection circuit, 22A represents a bias current selection circuit, 22B represents an output resistance selection circuit, 24 represents a MOSFET for main switching, 26 represents a MOSFET for synchronous rectification, 28 represents a choke coil, 30 represents a capacitor, 32 represents a power supply input terminal, 34 represents a switching output terminal (node), 36 represents a power supply output terminal, 38 represents a differential amplifier, 40 represents a constant current source circuit, 40A represents a first constant current source, 40B represents a second constant current source, 42 represents an output circuit, 46 represents an output resistor, 48 represents a capacitor, and 50 represents a switch for switching output resistance.

DESCRIPTION OF THE EMBODIMENTS

In the following, preferred embodiments of the present invention will be explained with reference to the attached figures.

Figure 1:
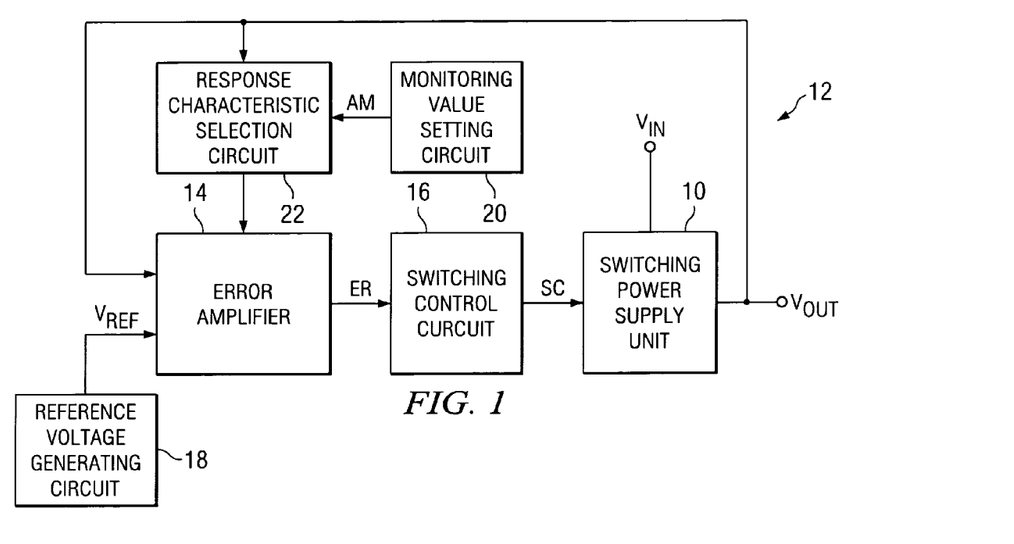
FIG. 1 is a block diagram illustrating the basic configuration of the DC—DC converter disclosed in the present invention.

FIG. 1 shows the basic configuration of the DC—DC converter disclosed in the present invention. The DC—DC converter of the present invention includes a switching element that can be turned on/off at high frequency. The converter is comprised of a switching power supply unit 10, which turns on/off the switching element to convert a DC input voltage $V_{in}$ into a DC output voltage $V_{out}$, and a control unit 12, which controls the on/off operation of the switching element of said switching power supply unit 10.

Control unit 12 comprises error amplifier 14, switching control circuit 16, reference voltage generating circuit 18, monitoring value setting circuit 20, and response characteristic selection circuit 22. The reference value or reference voltage $V_{ref}$ from reference voltage generating circuit 18 is input together with the output voltage $V_{out}$ from switching power supply unit 10 to error amplifier 14. Error amplifier 14, which is constituted as a differential amplifier, for example, compares the feedback voltage $V_{out}$ with reference voltage $V_{ref}$ and outputs an error signal ER having a voltage level corresponding to the comparison error ($V_{ref}-V_{out}$). Said error amplifier 14 has two types (first and second) of response characteristics, whose responsivities differ in stepwise fashion, with respect to the feedback voltage $V_{out}$. The error signal is output under the response characteristic selected by response characteristic selection circuit 22 to be described below. In this case, the second response characteristic has greater responsivity, in terms of response sensitivity or response speed, than the first response characteristic.

Switching control circuit 16 supplies a PWM (pulse width modulation) type switching drive pulse SC to the switching element of switching power supply unit 10. It has an oscillator and varies the duty ratio of the switching drive pulse SC in the direction to make output voltage $V_{out}$ consistent with response voltage $V_{ref}$ corresponding to the error signal ER output from error amplifier 14. The oscillator in switching control circuit 16 can be either an oscillator independent of switching power supply unit 10 (separately excited) or an oscillator constituted using the transformer and distribution capacitor, etc. in switching power supply unit 10 (self-excited).

Monitoring value setting circuit 20 is used to set a monitoring value for protecting output voltage $V_{out}$ of the DC—DC converter from over-voltages and under-voltages. The set monitoring value AM is supplied to response characteristic selection circuit 22. Response characteristic selection circuit 22 constantly monitors whether output voltage $V_{out}$ is in the range of said monitoring value AM and selects either the first or the second response characteristic in error amplifier 14 corresponding to the monitoring result.

In this DC—DC converter, during the period when the DC output voltage $V_{out}$ from switching power supply unit 10 is within the range of the monitoring value AM set by monitoring value setting circuit 20, the first response characteristic is selected by response characteristic selection circuit 22 as the response characteristic of error amplifier 14, and the constant voltage control is conducted under the first response characteristic. In other words, error amplifier 14 compares feedback voltage $V_{out}$ with reference voltage $V_{ref}$ under the first response characteristic and outputs error signal ER corresponding to the comparison error. Switching control circuit 16 varies the duty ratio of the switching drive pulse SC sent to the switching element in switching power supply unit 10 in the direction to make output voltage $V_{out}$ consistent with reference voltage $V_{ref}$ corresponding to the error signal ER. This constant voltage control emphasizes stability as the response characteristic of the feedback loop, so that some delay is acceptable.

On the other hand, when DC output voltage $V_{out}$ is out of the range of said monitoring value AM for some reason, the second response characteristic having higher sensitivity or speed than the first response characteristic is selected by response characteristic selection circuit 22 as the response characteristic of error amplifier 14, and a constant voltage control is maintained via the second response characteristic. In other words, error amplifier 14 outputs error signal ER via the second response characteristic, and switching control circuit 16 varies the duty ratio of the switching drive pulse SC corresponding to error signal ER. This constant voltage control conducted in the case of over-voltage emphasizes a high-speed response of the feedback loop, so that little delay is preferred.

As described above, the DC—DC converter of the present invention is characterized by the fact that when the DC output voltage $V_{out}$ is out of the range of monitoring value AM, the response characteristic of the feedback loop (the response characteristic of error amplifier 14) is switched to the one with greater responsivity to continue the switching control operation without stopping the switching control operation of the control system. In this way, when the over-voltage output is not a result of damage but only of a change in input voltage within the range of the normal operating conditions, by switching the response characteristic in error amplifier 14 from the first response characteristic to the second response characteristic as described above, the level of output voltage $V_{out}$ can be quickly pulled back within the range of monitoring value AM, and the constant voltage control can reach a new stable state within a short period of time to restore output voltage $V_{out}$ to its original level. Consequently, a stable power supply voltage can be supplied to the load. Also, since the control system can continue the switching control operation without interruption, a stable and reliable feedback operation can be guaranteed without losing the directivity of the constant voltage control.

Needless to say, it is also possible to provide the DC—DC converter of the present invention with over-voltage protection with respect to damage (not shown in the figure). Since the main objective of the present invention is over-voltage protection with respect to normal operating conditions, it is desirable to set the monitoring value AM used in the present invention to a value (absolute value) below the monitoring value (BM) for over-voltage as a result of damage. For example, in the present invention, the upper limit monitoring value AMu can be set to a 120% value with respect to the over-voltage output under normal situations, while the monitoring value BM for the over-voltage as a result of damage can be set to a 150% value. In the present invention, when output voltage $V_{out}$ exceeds upper monitoring value AMu, by switching the response characteristic of the feedback loop (especially the error amplifier) to the one with higher sensitivity or speed, the output voltage within the range of normal operating conditions can be quickly pulled back into the range of upper monitoring value AMu. The output voltage $V_{out}$ will not reach the monitoring value BM used for the over-voltage as a result of damage. Therefore, the protection circuit used in case of over-voltage as a result of damage will not be started. Since an over-voltage for which the control of the present invention is ineffective is an over-voltage as a result of damage that exceeds the monitoring value BM, the protection circuit will be started at that time to stop the switching control operation of the control system and shut down the supply of the output voltage $V_{out}$ to the load. In addition to the aforementioned protection circuit used for over-voltage as a result of damage, it is also possible to include an over-current protection circuit or an over-temperature protection circuit, etc.

More specifically, it is preferred that the response characteristic of error amplifier 14 used in the present invention is response speed or gain. The following embodiments disclose preferred methods used for quickly and properly switching the response characteristic in error amplifier 14.

Embodiment 1

Figure 2:
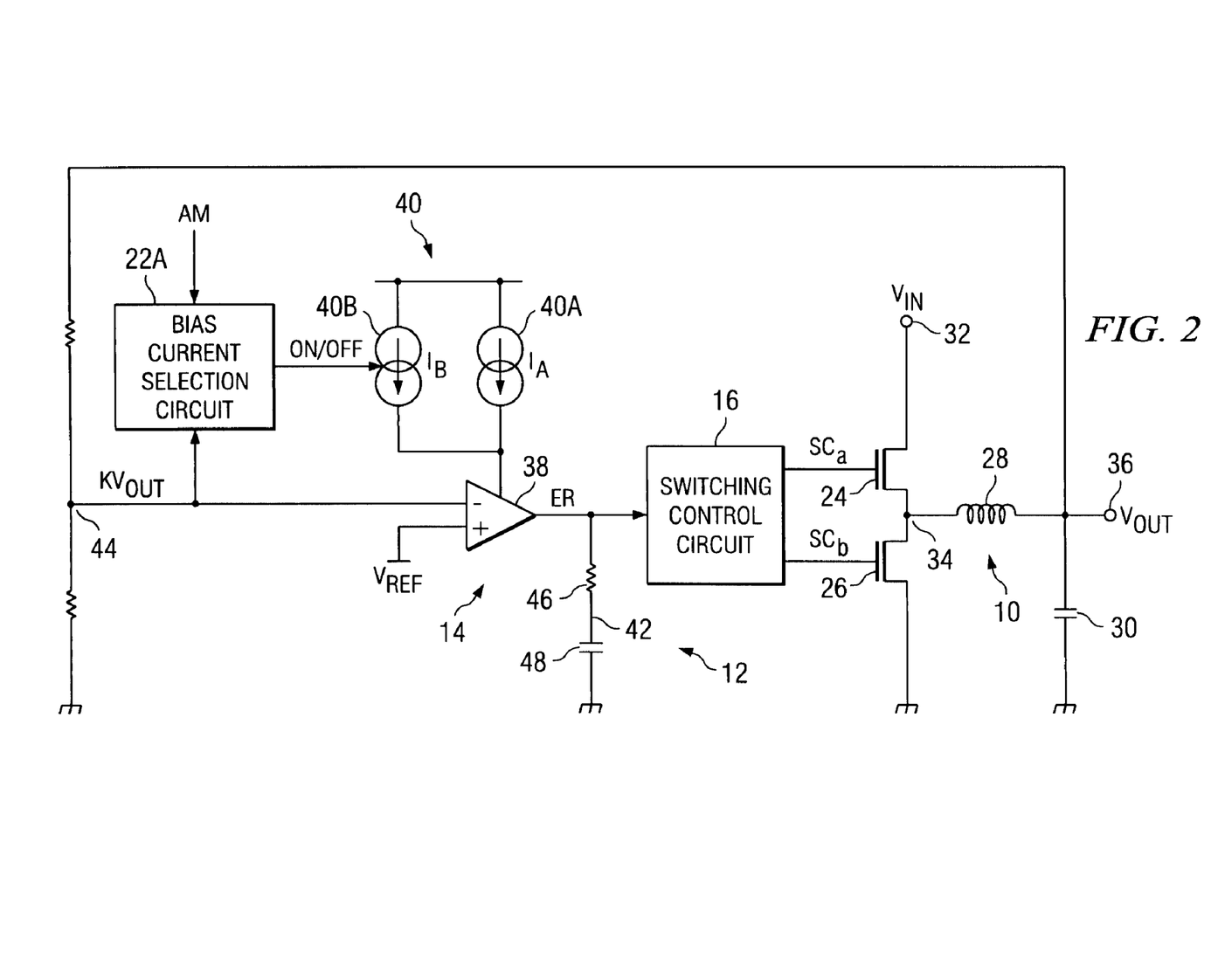
FIG. 2 is a circuit diagram illustrating the configuration of the DC—DC converter disclosed in the first embodiment.

FIG. 2 shows the configuration of the DC—DC converter disclosed in the first embodiment of the present invention. In this DC—DC converter, switching power supply unit 10 is a step-down chopper. It has MOSFET 24 for main switching and MOSFET 26 for synchronous rectification as the switching elements. The rectifying and smoothing circuit is comprised of choke coil 28 and smoothing capacitor 30.

More specifically, one of the terminals of MOSFET 24 for main switching is connected to power supply input terminal 32, which inputs DC input voltage $V_{in}$. The other terminal is connected to switching output terminal (node) 34. One of the terminals of MOSFET 26 for synchronous rectification is connected to switching output terminal (node) 34, while the other terminal is connected to ground potential. One of the terminals of choke coil 28 is connected to switching output terminal (node) 34, while the other terminal is connected to power supply output terminal 36, which supplies the DC output voltage $V_{out}$ to the load. One of the terminals of smoothing capacitor 30 is connected to power supply output terminal 36, while the other terminal is connected to ground potential.

Switching drive pulses SCa, SCb with opposite polarity are supplied by switching control circuit 16 to the control terminals of two MOSFET 24, 26, respectively. Consequently, when MOSFET 24 for main switching is on, MOSFET 26 for synchronous rectification is off. Input voltage $V_{in}$ is supplied to choke coil 28 via MOSFET 24, and energy is stored in choke coil 28. When MOSFET 24 for main switching is off, MOSFET 26 for synchronous rectification is turned on. During that period, the stored energy is released from choke coil 28 to the output side (load side). When the on-time ratio or duty ratio of MOSFET 24 for main switching is controlled in a variable manner, output voltage $V_{out}$ can be controlled to any voltage level below input voltage $V_{in}$.

In this DC—DC converter, error amplifier 14 has differential amplifier 38 comprises an operational amplifier, constant current source circuit 40 that supplies bias current to each component of differential amplifier 38, and output circuit 42 connected between the output terminal of differential amplifier 38 and ground potential.

Differential amplifier 38 is an operational amplifier, for example. The reference voltage $V_{ref}$ from reference voltage generating circuit 18 (FIG. 1) is input to its non-inverting input terminal (+). The feedback signal KVout (0<K<1) obtained by dividing the output voltage $V_{out}$ sent from switching power supply unit 10 by voltage divider resistor circuit 44 is input to its inverting input terminal (−). Said differential amplifier 38 includes a differential input part, where the difference voltage ($V_{ref}$−$KV_{out}$) between the two input signals $V_{ref}$, $KV_{out}$ is applied, and a voltage amplification part, which amplifies the difference voltage of the differential input part. Each of these stages or parts operates under the bias current I supplied from constant current source circuit 40. Therefore, as bias current I increase, the response sensitivity or response speed of differential amplifier 38 also increases.

Said constant current source circuit 40 includes at least two independent current sources 40A, 40B connected in parallel. The first constant source 40A supplies a constant bias current $I_A$ to each part (differential input part, voltage amplification part, etc.) in differential amplifier 38. The second constant current source 40B receives the on/off control performed by bias current selection circuit 22A (to be described below). It is kept off when error amplifier 14 has the first response characteristic and is turned on when error amplifier 14 has the second response characteristic. When the second constant current source 40B is on, the bias current $I_A$ from the first constant current source 40A and the bias current $I_B$ from the second current source 40B are combined to obtain a bias current ($I_A$+$I_B$), which is supplied to each part of differential amplifier 38. The magnitudes and ratio of the two bias currents $I_A$, $I_B$ can be set as desired. For example, the ratio can be set to $I_A$:$I_B$=1:2.

Output circuit 42 is a series connection of output resistor 46 and capacitor 48. More specifically, one of the terminals of output resistor 46 is connected to the output terminal of differential amplifier 38, and one of the terminals of capacitor 48 is connected to ground potential. The other terminal of resistor 46 and the other terminal of capacitor 48 are connected to each other. A source current or a sink current flows from differential amplifier 38 to said output circuit 42 to charge/discharge capacitor 48 via output resistor 46.

Bias current selection circuit 22A is equivalent to the response characteristic selection circuit 22 shown in FIG. 1. It compares the output voltage $V_{out}$ obtained from switching power supply unit 10 or the feedback signal $KV_{out}$ sent from voltage divider resistor circuit 44 with the upper limit monitoring value AMu sent from monitoring value setting circuit 20 (FIG. 1) and selects $I_A$ as the bias current supplied from constant current source circuit 40 to each part of differential amplifier 38 when $V_{out}$≦AMu (the second constant current source 40B is kept off) and selects ($I_A$+$I_B$) when $V_{out}$>AMu (the second constant current source 40B is turned on).

Switching control circuit 16, for example, has an oscillator that generates a prescribed triangle or sawtooth waveform at a prescribed frequency, such as 500 kHz, a comparator that receives the triangle or sawtooth signal sent from the oscillator and the error signal ER sent from error amplifier 14 as inputs and generates a binary signal or a square wave pulse having a pulse width corresponding to the relationship between the voltage levels of the two input signals, and a drive circuit that outputs switching drive pulses SCa, SCb to the switching elements 24, 26 of switching power supply unit 10 corresponding to the output of the comparator.

Figure 3:
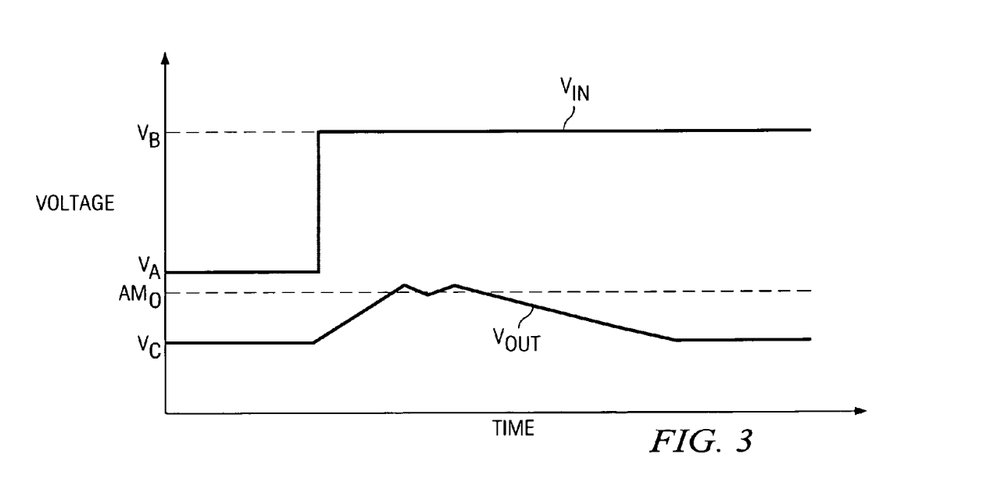
FIG. 3 is a waveform diagram explaining the operation in the first embodiment.
Figure 4:
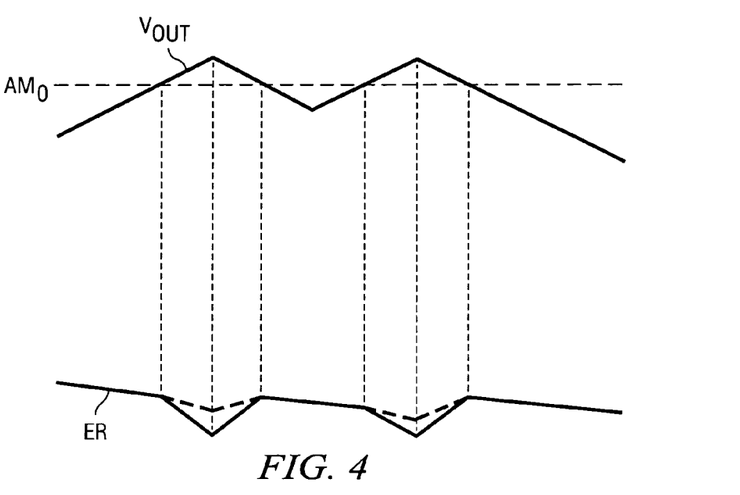
FIG. 4 is a waveform diagram of main part explaining the operation in the first embodiment.

FIGS. 3 and 4 show an example of a change in the input voltage and the response in the output voltage to explain the operation of the DC—DC converter disclosed in this embodiment. For example, when the plug (DC output terminal) of the AC adapter of a portable electronic device having this DC—DC converter is inserted into a power socket, as shown in FIG. 3, input voltage $V_{in}$ rises from the power supply voltage $V_A$ of the internal battery (for example, 2 V) to the power supply voltage $V_B$ of the AC adapter (for example 5V) in stepwise fashion.

At that time, in the DC—DC converter, differential amplifier 38 operates under bias current $I_A$ to perform the constant voltage control under normal situations. Although the feedback loop reduces the duty ratio of switching drive pulse SCa as a result of the sudden rise of input voltage $V_{in}$, it is unable to follow the abrupt stepwise rise ($V_A$→$V_B$). As a result, the level of output voltage $V_{out}$ rises significantly from the constant level Vc (for example, 1.8 V) along with the input voltage $V_{in}$.

When output voltage $V_{out}$ exceeds the upper limit monitoring value AMu (for example, 2.2 V), bias current selection circuit 22A starts to operate to turn on the second constant current source 40B of constant current source circuit 40. When differential amplifier 38 operates under bias current ($I_A$+$I_B$), the response sensitivity or response speed of error amplifier 14 is increased, and as shown in FIG. 4, the rate of change of error signal ER is also increased. In other words, when the output current (in this case, sink current) of differential amplifier 38 is increased, the voltage drop across the output resistor 46 in output circuit 42 increases instantaneously and significantly without being limited by the charging/discharging of capacitor 48, and the rate of change of the error signal ER obtained at the output terminal of differential amplifier 38 is increased. When the response characteristic of the feedback loop is switched as described above to apply high-speed, high-amplitude negative feedback, the output voltage $V_{out}$ will be immediately pulled back to a level below the upper limit monitoring value AMu once it exceeds the upper limit monitoring value AMu.

In this embodiment, when output voltage $V_{out}$ drops below upper limit monitoring value AMu, bias current selection circuit 22A turns off the second constant current source 40B and restores the bias current of differential amplifier 38 to $I_A$. As a result, the responsivity of the feedback loop is decreased or relaxed, and output voltage $V_{out}$ might surpass upper limit monitoring value AMu again as shown in FIG. 4. If that occurs, the aforementioned high-amplitude negative feedback is again applied by switching the bias current to differential amplifier 38 to ($I_A$+$I_B$). As a result, output voltage $V_{out}$ is immediately pulled back below upper limit monitoring value AMu. After this hunting process is repeated one or more times, the feedback loop catches up to the new level $V_B$ of the input voltage $V_{in}$. Thereafter, output voltage $V_{out}$ is gradually and stably restored to the constant level Vc under the bias current $I_A$, that is, under the first response characteristic.

In this embodiment, when the discharge current of capacitor 46 of output circuit 42 is increased during the period of switching the bias current to ($I_A$+$I_B$) with respect to differential amplifier 38, the discharge time of capacitor 46 can be shortened, and the time required to reach or restore the constant state can be further shortened.

Also, in this embodiment, MOSFET 26 for synchronous rectification is used in switching power supply unit 10.

Typically, when said MOSFET 26 is on (when MOSFET 24 for main switching is off), a reflex current flows on the side of choke coil 10 from ground through MOSFET 26. However, it is different from the asynchronous rectification method using a diode. In the aforementioned over-voltage output state, when MOSFET 26 is on, the flow of a current in the opposite direction from the side of the output terminal is allowed. In this way, the electric charge or energy on the output side can return to the input side via MOSFET 26. In particular, when the duty cycle is low compared with the output voltage, almost 100% of that state can be restored so that the over-voltage output can be more actively relaxed.

As an embodiment variant, it is also possible to include hysteresis characteristic in the switching operation of bias current selection circuit 22A. In other words, it is also possible to include any offset between the upper limit monitoring value $AM_u$ at the time of switching the bias current with respect to differential amplifier 38 from $I_A$ to $(I_A+I_B)$ and the upper limit monitoring value $AM_u$ at the time of switching from $(I_A+I_B)$ to $I_A$. FIG. 4 shows a simplified waveform for explaining the operation of the present invention. To make the explanation easy to understand, the delay of the feedback loop is ignored.

Embodiment 2

Figure 5:
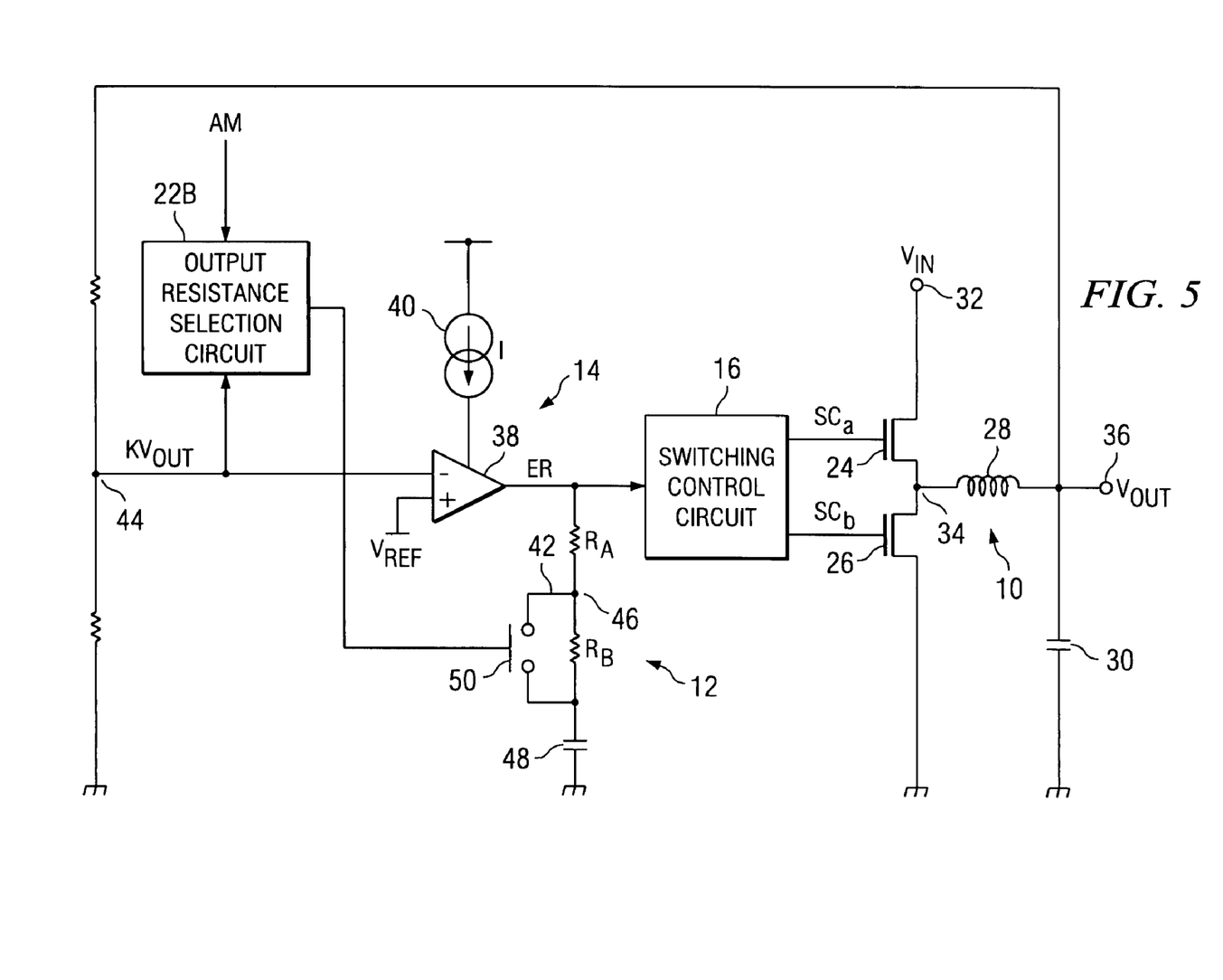
FIG. 5 is a circuit diagram illustrating the configuration of the DC—DC converter disclosed in the second embodiment.

FIG. 5 shows the configuration of the DC—DC converter disclosed in the second embodiment. In this figure, the parts having the same configuration or same function as those described in the first embodiment (FIG. 2) are represented by the same symbols, respectively.

In the second embodiment, in error amplifier 14, a constant bias current I is supplied constantly from constant current source circuit 40 to differential amplifier 38. Under the control of output resistance selection circuit 22B that corresponds to response characteristic selection circuit 22 (FIG. 1), the resistance of output resistor 46 in output circuit 42 is switched between $R_A$ and $(R_A+R_B)$ by a switch 50. The magnitudes and the ratio of $R_A$ and $R_B$ can be set as desired. For example, the ratio can be set to $R_A:R_B=1:1$.

In general, in a DC—DC converter, input voltage $V_{in}$ might also drop significantly within the scope of the normal operating conditions. For example, when the plug (DC output terminal) of the AC adapter of a portable electronic device having the DC—DC converter is pulled out from a power socket, input voltage $V_{in}$ drops stepwise from the power supply voltage $V_B$ (for example, 5 V) of the AC adapter to the power supply voltage $V_A$ (for example, 2 V) of the internal battery. The second embodiment is particularly effective on sharp drop of input voltage $V_{in}$ within the range of the normal operating conditions.

The operation of the second embodiment will be explained based on FIG. 6. In the DC—DC converter disclosed in the second embodiment, the first response characteristic is also selected for error amplifier 14 in the normal state. In other words, output resistance selection circuit 22B closes the switch 50 of output circuit 42 to select $R_A$ as the resistance of output resistor 46.

Figure 6:
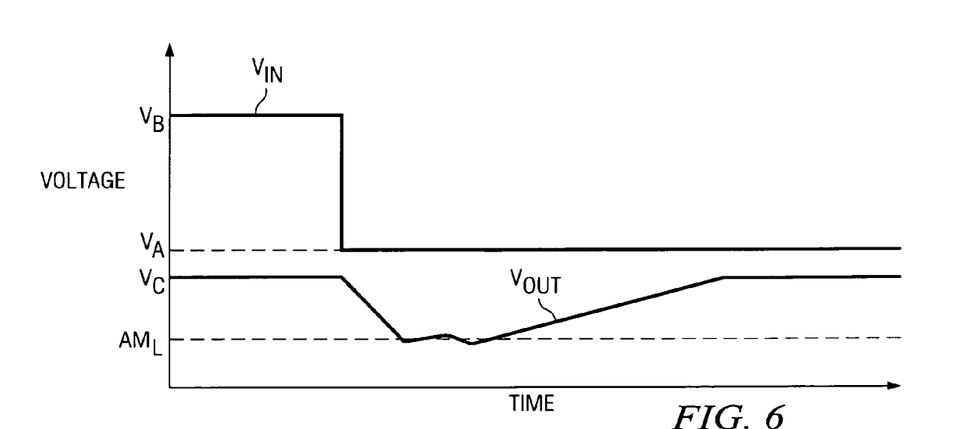
FIG. 6 is a waveform diagram explaining the operation in the second embodiment.

When input voltage $V_{in}$ drops stepwise from $V_B$ (5 V) to $V_A$ (2 V) as shown in FIG. 6, although the feedback loop increases the duty ratio of switching drive pulse CSa as a result of the sudden drop in input voltage $V_{in}$, it is unable to follow the abrupt change. As a result, the level of output voltage $V_{out}$ falls with the input voltage Vin from the constant level Vc (for example, 1.8 V). When the output voltage $V_{out}$ drops (falls) below the range of lower limit monitoring value AML (for example, 1.4 V), resistance selection circuit 22B operates to open switch 50 to select $(R_A+R_B)$ as the resistance of output resistor 46.

By increasing the resistance of output resistor 46 as described above, the response sensitivity or response speed of error amplifier 14 can be increased, and the rate of change of error signal ER can be increased. In other words, since the bias current I supplied from constant current source circuit 40 is constant, the output current (in this case, the source current) of differential amplifier 38 is not increased. However, when the resistance of output resistor 46 is increased from $R_A$ to $(R_A+R_B)$, the voltage drop across output resistor 46 increases instantaneously and abruptly without being limited by the charging/discharging of capacitor 48, and the rate of change of error signal ER obtained at the output terminal of differential amplifier 38 is increased.

When the response characteristic of the feedback loop is switched to apply high-speed, high-amplitude negative feedback, output voltage $V_{out}$ can be immediately pulled back to a level higher than lower limit monitoring value $AM_L$ once it breaks the range of lower limit monitoring value $AM_L$. Like the first embodiment, in this case, the feedback loop catches up to the new level $V_A$ of input voltage $V_{in}$ after one or several hunting cycles conducted on the basis of lower limit monitoring value $AM_L$. Then, with switch 50 for switching the output resistance open, output voltage $V_{out}$ is gradually and stably restored to the stable level Vc under the first response characteristic.

In this embodiment, as an embodiment variant, it is also possible to include hysteresis characteristic in the switching operation of output resistance selection circuit 22B. That is, it is also possible to include any offset between the lower limit monitoring value $AM_L$ at the time of switching the resistance of output resistor 64 from $R_A$ to $(R_A+R_B)$ and the lower limit monitoring value $AM_L$ at the time of switching from $(R_A+RB)$ to $R_A$.

As explained above, by using the DC—DC converter of the present invention, the operation of the control system can respond quickly and suitably without being interrupted in spite of abrupt and significant changes in the input voltage within the scope of normal operating conditions. In most electronic devices, protection circuits overlap. There is no need to use the protective functions of each protection circuit to individually handle various abnormal and defective operations. The present invention minimizes the influence on the protective system by providing a special countermeasure against the instantaneous transitory changes in input voltage within the scope of normal operating conditions.

The present invention is not limited to the embodiment described above. It includes various modifications and changes within the range of its technical teaching. For example, the circuit configuration or control method of switching power supply unit 10 may be variously modified. For example, MOSFET 26 for synchronous rectification can be replaced with a diode, which performs asynchronous rectification. Also, the aforementioned first and second embodiments describe separately-excited DC—DC converters, which can also be self-excited. The configurations or types of error amplifier 14 and switching control circuit 16 may also be variously modified. The aforementioned first and second embodiments can be combined. It is also possible to use three or more types of response characteristics, one of which is selected.

The invention claimed is:

1. A DC—DC converter comprising the following:
   a switching power supply unit, which has a switching element that can be turned on/off at high frequency and can turn on/off the aforementioned switching element to convert a DC input voltage into a DC output voltage;

an error amplifier, which compares the aforementioned DC output voltage obtained from the aforementioned switching power supply unit with a reference value and outputs an error signal corresponding to the comparison error under a selected response characteristic, that is, either a first response characteristic or a second response characteristic having greater responsivity than the first response characteristic;

a switching control unit, which generates a switching drive pulse corresponding to the aforementioned error signal output from the error amplifier for making the DC output voltage consistent with the aforementioned reference value and sends the switching drive pulse to the aforementioned switching element; and a response characteristic selection circuit, which compares the aforementioned DC output voltage with a desired monitoring value and selects the aforementioned first response characteristics as the response characteristic of the aforementioned error amplifier when the DC output voltage is within the range of the aforementioned monitoring value and selects the second response characteristic as the response characteristic of the error amplifier when the DC output voltage is out of the range of the monitoring value.

2. The DC—DC converter of claim 1 wherein the switching power supply unit is a chopper type switching power supply unit, which converts the aforementioned DC input voltage into a square-wave DC voltage the aforementioned switching element and rectifies and smooths the square-wave DC voltage to convert it into the aforementioned DC output voltage.

3. The DC—DC converter of claim 2 wherein the switching power supply unit comprises a choke coil, which is connected between the switching element and the output terminal of the aforementioned DC output voltage, and a capacitor connected between the output terminal of the DC output voltage and ground potential.

4. The DC—DC converter of claim 3 wherein the switching element comprises a first transistor, which is connected between the input terminal of the aforementioned DC input voltage and the output terminal of the switching element, and a second transistor connected between the output terminal of the switching element and ground potential; wherein the aforementioned switching control unit drives the first and second transistors using first and second switching drive pulses of opposite polarity, respectively.

5. The DC—DC converter of any of claim 4 wherein the switching control unit controls the pulse width of the aforementioned switching drive pulse in a variable manner corresponding to the error signal output from the aforementioned error amplifier.

6. The DC—DC converter of any of claim 2 wherein the switching control unit controls the pulse width of the aforementioned switching drive pulse in a variable manner corresponding to the error signal output from the aforementioned error amplifier.

7. The DC—DC converter of any of claim 3 wherein the switching control unit controls the pulse width of the aforementioned switching drive pulse in a variable manner corresponding to the error signal output from the aforementioned error amplifier.

8. The DC—DC converter of claim 1 wherein the switching control unit controls the pulse width of the aforementioned switching drive pulse in a variable manner corresponding to the error signal output from the aforementioned error amplifier.

9. A DC—DC converter comprising the following:

a switching power supply unit, which has a switching element that can be turned on/off at high frequency and can turn on/off the aforementioned switching element to convert a DC input voltage into a DC output voltage;

an error amplifier, which compares the aforementioned DC output voltage obtained from the aforementioned switching power supply unit with a reference value and outputs an error signal corresponding to the comparison error at a selected response speed, that is, either a first response speed or a second response speed higher than the first response speed;

a switching control unit, which generates a switching drive pulse corresponding to the aforementioned error signal output from the error amplifier for making the DC output voltage consistent with the aforementioned reference value and sends the switching drive pulse to the aforementioned switching element; and a response speed selection circuit, which compares the aforementioned DC output voltage with a desired monitoring value and selects the aforementioned first response speed as the response speed of the aforementioned error amplifier when the DC output voltage is within the range of the aforementioned monitoring value and selects the second response speed as the response speed of the error amplifier when the DC output voltage is out of the range of the monitoring value.

10. The DC—DC converter of any of claim 9 wherein the switching power supply unit is a chopper type switching power supply unit, which converts the aforementioned DC input voltage into a square-wave DC voltage the aforementioned switching element and rectifies and smooths the square-wave DC voltage to convert it into the aforementioned DC output voltage.

11. The DC—DC converter of any of claim 9 wherein the switching control unit controls the pulse width of the aforementioned switching drive pulse in a variable manner corresponding to the error signal output from the aforementioned error amplifier.

12. A DC—DC converter comprising the following:

a switching power supply unit, which has a switching element that can be turned on/off at high frequency and can turn on/off the aforementioned switching element to convert a DC input voltage into a DC output voltage;

an error amplifier, which compares the aforementioned DC output voltage obtained from the aforementioned switching power supply unit with a reference value and outputs an error signal corresponding to the comparison error at a selected gain, that is, either a first gain or a second gain higher than the first gain;

a switching control unit, which generates a switching drive pulse corresponding to the aforementioned error signal output from the error amplifier for making the DC output voltage consistent with the aforementioned reference value and sends the switching drive pulse to the aforementioned switching element; and a gain selection circuit, which compares the aforementioned DC output voltage with a desired monitoring value and selects the aforementioned first gain as the gain of the aforementioned error amplifier when the DC output voltage is within the range of the aforementioned monitoring value and selects the second gain as the gain of the error amplifier when the DC output voltage is out of the range of the monitoring value.

13. The DC—DC converter of any of claim 12 wherein the switching power supply unit is a chopper type switching power supply unit, which converts the aforementioned DC input voltage into a square-wave DC voltage the aforementioned switching element and rectifies and smooths the square-wave DC voltage to convert it into the aforementioned DC output voltage.

14. The DC—DC converter of any of claim 12 wherein the switching control unit controls the pulse width of the aforementioned switching drive pulse in a variable manner corresponding to the error signal output from the aforementioned error amplifier.

15. A DC—DC converter comprising the following:
a switching power supply unit, which has a switching element that can be turned on/off at high frequency and can turn on/off the aforementioned switching element to convert a DC input voltage into a DC output voltage;
an error amplifier, which compares the aforementioned DC output voltage obtained from the aforementioned switching power supply unit with a reference value and outputs an error signal corresponding to the comparison error using a selected bias current, that is, either a first bias current or a second bias current larger than the first bias current;
a switching control unit, which generates a switching drive pulse corresponding to the aforementioned error signal output from the error amplifier for making the DC output voltage consistent with the aforementioned reference value and sends the switching drive pulse to the aforementioned switching element; and
a bias current selection circuit, which compares the aforementioned DC output voltage with a desired monitoring value and selects the aforementioned first bias current as the bias current of the aforementioned error amplifier when the DC output voltage is within the range of the aforementioned monitoring value and selects the second bias current as the bias current of the error amplifier when the DC output voltage is out of the range of the monitoring value.

16. The DC—DC converter of any of claim 15 wherein the switching power supply unit is a chopper type switching power supply unit, which converts the aforementioned DC input voltage into a square-wave DC voltage the aforementioned switching element and rectifies and smooths the square-wave DC voltage to convert it into the aforementioned DC output voltage.

17. The DC—DC converter of any of claim 15 wherein the switching control unit controls the pulse width of the aforementioned switching drive pulse in a variable manner corresponding to the error signal output from the aforementioned error amplifier.

18. A DC—DC converter comprising the following:
a switching power supply unit, which has a switching element that can be turned on/off at high frequency and can turn on/off the aforementioned switching element to convert a DC input voltage into a DC output voltage;
an error amplifier, which has a differential amplifier, which compares the aforementioned DC output voltage obtained from the aforementioned switching power supply unit with a reference value and outputs an error signal corresponding to the comparison error, and an output circuit, which includes an output resistor and a capacitor connected in series between the output terminal of the aforementioned differential amplifier and ground potential, and which can select the resistance of the aforementioned output resistor between a first resistance and a second resistance higher than the first resistance;
a switching control unit, which generates a switching drive pulse corresponding to the aforementioned error signal output from the error amplifier for making the DC output voltage consistent with the aforementioned reference value and sends the switching drive pulse to the aforementioned switching element; and
an output resistance selection circuit, which compares the aforementioned DC output voltage with a desired monitoring value and selects the aforementioned first resistance as the resistance of the output resistor in the aforementioned error amplifier when the DC output voltage is within the range of the aforementioned monitoring value and selects the second resistance as the resistance of the output resistor when the DC output voltage is out of the range of the monitoring value.

19. The DC—DC converter of any of claim 18 wherein the switching power supply unit is a chopper type switching power supply unit, which converts the aforementioned DC input voltage into a square-wave DC voltage the aforementioned switching element and rectifies and smooths the square-wave DC voltage to convert it into the aforementioned DC output voltage.

20. The DC—DC converter of any of claim 18 wherein the switching control unit controls the pulse width of the aforementioned switching drive pulse in a variable manner corresponding to the error signal output from the aforementioned error amplifier.

* * * * *